(12) United States Patent
Biskeborn

(10) Patent No.: US 7,393,262 B2
(45) Date of Patent: Jul. 1, 2008

(54) APPARATUS INCLUDING PIN ADAPTER FOR AIR BEARING SURFACE (ABS) LAPPING

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 09/938,457

(22) Filed: Aug. 23, 2001

(65) Prior Publication Data

US 2003/0040257 A1    Feb. 27, 2003

(51) Int. Cl.
   *B24B 49/10*   (2006.01)
(52) U.S. Cl. .............................. 451/8; 451/5; 29/603.15; 29/603.16
(58) Field of Classification Search ................... 451/1, 451/5, 10, 11, 8; 29/603.15, 603.16
   See application file for complete search history.

(56) References Cited

U.S. PATENT DOCUMENTS

| | | | | |
|---|---|---|---|---|
| 4,675,986 A | * | 6/1987 | Yen | 29/603.1 |
| 4,689,877 A | * | 9/1987 | Church | 29/603.1 |
| 4,914,868 A | * | 4/1990 | Church et al. | 451/5 |
| 5,065,483 A | * | 11/1991 | Zammit | 29/603.09 |
| 5,237,476 A | * | 8/1993 | Bischoff et al. | 360/126 |
| 5,494,473 A | * | 2/1996 | Dupuis et al. | 451/1 |
| 5,876,264 A | * | 3/1999 | Church et al. | 451/5 |
| 5,883,770 A | | 3/1999 | Biskeborn et al. | 360/130.21 |
| 5,905,613 A | | 5/1999 | Biskeborn et al. | 360/130 |
| 5,951,371 A | * | 9/1999 | Hao | 451/28 |
| 5,997,381 A | | 12/1999 | Dee et al. | 451/5 |
| 6,122,147 A | | 9/2000 | Fahimi et al. | 360/221 |
| 6,196,897 B1 | * | 3/2001 | Suto et al. | 451/8 |

* cited by examiner

*Primary Examiner*—Timothy V Eley
(74) *Attorney, Agent, or Firm*—Zilka-Kotab, PC

(57) ABSTRACT

A system is provided for measuring a head during a lapping process. First provided is a wafer including at least one head each having an electrical lapping guide (ELG), a plurality of wafer contacts in electrical communication with the ELG, and a closure formed thereon defining a slot in which the wafer contacts are positioned. Also included is a lapping cable coupled to a testing device. The lapping cable includes a plurality of lapping cable contacts. An adapter includes a plurality of adapter contacts in electrical communication with the lapping cable contacts. The adapter contacts are removably positionable in electrical communication with the wafer contacts for measuring the head during a lapping process.

10 Claims, 8 Drawing Sheets

(PROIR ART)

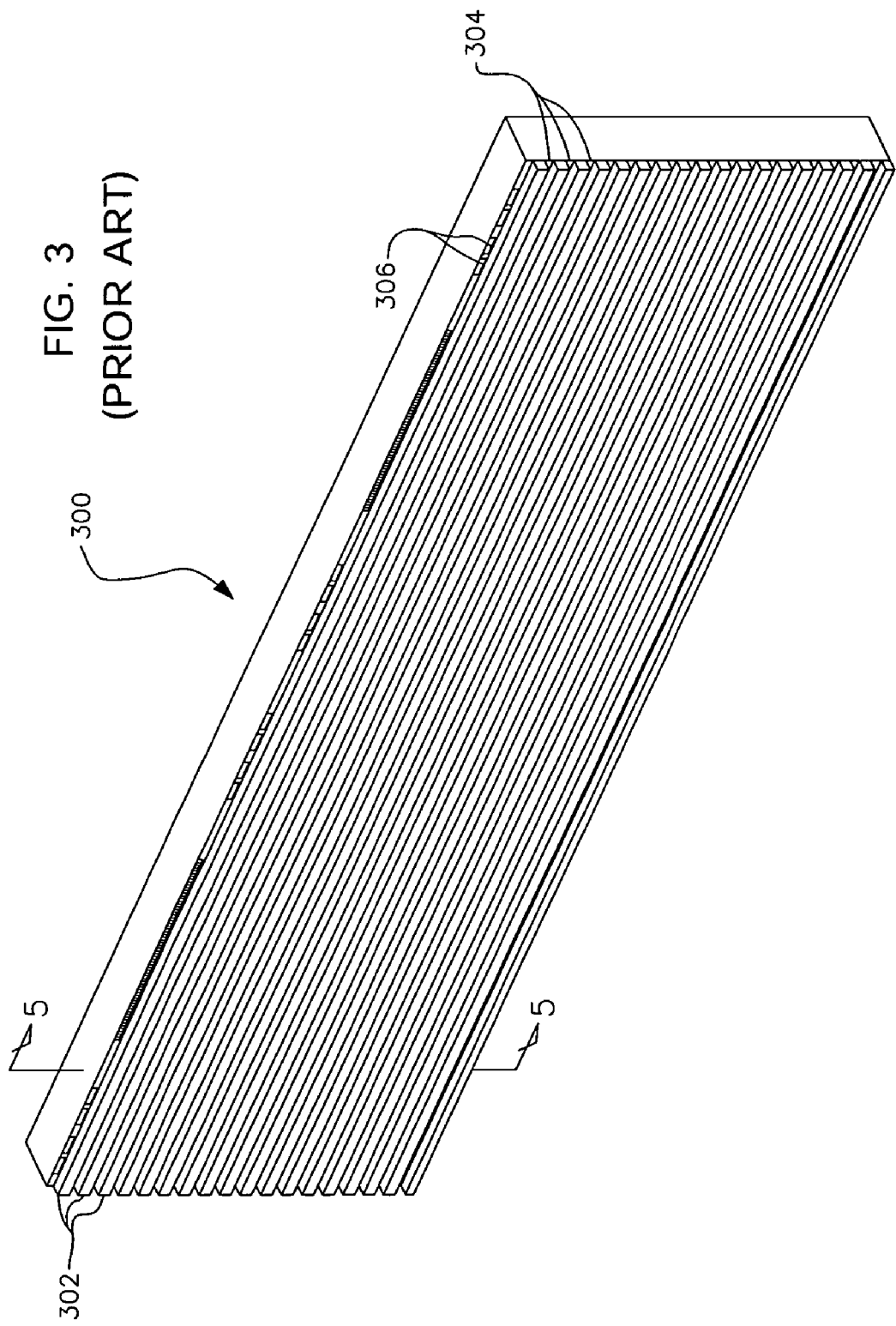

APPARATUS INCLUDING PIN ADAPTER FOR AIR BEARING SURFACE (ABS) LAPPING

FIELD OF THE INVENTION

The present invention relates to thin film recording heads, and more particularly, this invention relates to testing electrical lapping guides (ELGs) on thin film recording heads during a lapping process.

BACKGROUND OF THE INVENTION

Conventional recording heads for linear tape drives have small transducers incorporated into a large head assembly to span the full width of the tape. For recording heads fabricated using thin film wafer technology, this requires that the head either be fabricated individually on a wafer which is at least as wide as the recording tape and lapped individually to the proper shape, or be fabricated as a small part and assembled with larger pieces. In the second case, either the small parts or the full assembly is lapped to the proper shape.

Prior art FIG. 1 illustrates a wafer 100 on which a plurality of heads 102 may be manufactured. It should be noted that the wafer 100 is set forth for illustrative purposes only and the exact configuration of the wafer 100 may vary per the desires of the user. As shown, the wafer 100 includes two columns of multiple rows of heads 102. During the fabrication of the wafer 100, an array of heads 102 including transducers and auxiliary circuits are fabricated on a common substrate in a deposition of metallic and non-metallic layers. The auxiliary circuits are sometimes referred to as electrical lapping guides (ELGs). Patterning of the array of transducers and ELGs is accomplished using photolithography in combination with etching and lift-off processes. The finished array or wafer is then optically and electrically inspected and subsequently cut into smaller arrays of heads 102. Next, individual heads 102 are machined, at a surface 106 which will eventually face the recording medium, to obtain a desired read transducer height (sometimes referred to as the stripe height (SH) and a desired inductive transducer height (sometimes referred to as the throat height (TH).

During the manufacturing process, the surface 106 of each head 102 is lapped before being removed from the wafer 100. Such lapping reduces the height of the transducers. The primary function of the ELG(s) is to control the machining process such that the desired transducer height is achieved. After a particular row of transducers is machined to the desired transducer height as controlled by the ELG(s), the heads 102 are cut from the wafer 100. During this process, the ELG(s) can be destroyed if desired.

Typically, each ELG includes one or two resistors which are fabricated in the deposition of layers along with the transducers of the heads 102. A very simple ELG design has one resistor which is aligned with a transducer such that the machining process reduces the height of both the transducer and the resistor at the same time. The resistance of the machined resistor is monitored to determine when the desired height of the transducer has been achieved so that the machining process can be halted at this point.

In order to carry out the foregoing process utilizing the ELGs, an electrical connection must be established between the ELGs and a testing device. This is conventionally accomplished by way of a plurality of contacts 110 formed on each of the heads 102.

Prior art FIG. 2A is top plan view of a lapping cable 200 which is traditionally employed to connect a testing device to the contacts 110 formed on each of the heads 102. It should be noted that the lapping cable 200 is set forth for illustrative purposes only and the exact configuration of the lapping cable 200 may vary per the desires of the user. As shown, the lapping cable 200 is formed from a thin resilient material having a rectangular configuration. Such lapping cable 200 includes a plurality of wires 202 embedded therein which terminate at exposed planar contact pads 204 that are adapted to remain in electrical communication with the contacts 110 formed on each of the heads 102 during the lapping process. Prior art FIG. 2B is a cross-sectional view of the lapping cable 200 taken along line 2B-2B of FIG. 2A showing the planarity of the contact pads 204.

While the lapping cable 200 of FIG. 2A works well with the prior art wafers 100 of FIG. 1, difficulty arises when used with wafers having rows of closures formed thereon.

Prior art FIG. 3 illustrates a wafer 300 including a plurality of strips of closures 302 attached thereto. Such closures 302 define a plurality of slots 304 in which the aforementioned contacts 306 associated with the ELGs reside. Such closures 302 have recently become a common part of wafer processing in view of the benefits they afford in resultant heads. More information on the manufacture and use of closures 302 and the related benefits may be found with reference to U.S. Pat. Nos. 5,883,770 and 5,905,613 which are incorporated herein by reference in their entirety.

While such closures 302 of FIG. 3 afford various benefits, they cause complications in the lapping process. In particular, it is impossible for the contact pads 204 of the lapping cable 200 of FIGS. 2A & 2B to make contact with the contacts 306 positioned between the closures 302 of the wafer 300 of FIG. 3.

There is thus a need for an apparatus and method for affording electrical communication between a lapping cable and the contacts of a wafer during the lapping process associated with thin-film head manufacture involving closures.

DISCLOSURE OF THE INVENTION

A system is provided for measuring a head during a lapping process. First provided is a wafer including at least one head each having an electrical lapping guide (ELG), a plurality of wafer contacts in electrical communication with the ELG, and a closure formed thereon defining a slot in which the wafer contacts are positioned. Also included is a lapping cable coupled to a testing device. The lapping cable includes a plurality of lapping cable contacts. An adapter includes a plurality of adapter contacts in electrical communication with the lapping cable contacts. The adapter contacts are removably positionable in electrical communication with the wafer contacts for measuring the head during a lapping process.

In one embodiment, the adapter may be constructed from a polyimide material. Still yet, the adapter may include a pair of holes formed therein for coupling with a pair of holes formed in the lapping cable via a pair of alignment pins. As a further option, the adapter may include at least one guide for being removably positioned in a slot defined by closures of adjacent heads formed on the wafer. As yet another option, the adapter may include a recess for preventing contact with the wafer during the lapping process.

In another embodiment, the adapter contacts may be slidably coupled to the adapter. Further, the adapter contacts may each include a first portion in electrical communication with one of the lapping cable contacts and a second portion in electrical communication with one of the wafer contacts. As an option, the first portion of each adapter contact may be larger than the second portion of each adapter contact. In particular, the first portion and second portion may each have a generally cylindrical configuration, where the first portion of each adapter contact has a diameter larger than that of the second portion of each adapter contact.

A method is also provided for measuring a head during a lapping process. Initially, an adapter is releasably coupled to a lapping cable or alternatively to the wafer. The adapter includes a plurality of adapter contacts in electrical communication with a plurality of lapping cable contacts of the lapping cable. Thereafter, the adapter contacts of the adapter are removably positioned in electrical communication with a plurality of wafer contacts of a wafer. A surface of the wafer is subsequently lapped during which a head of the wafer is measured during the lapping process.

Another system is provided for measuring a head during a lapping process with an adapter that is an integral component of a lapping cable. In such embodiment, the lapping cable is coupled to a testing device. The lapping cable may include a plurality of lapping cable contacts extending outwardly therefrom in a direction perpendicular with respect to a plane associated with the lapping cable. Such lapping cable contacts are removably positionable in electrical communication with a plurality of wafer contacts of a wafer for measuring a head of the wafer during a lapping process.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

Prior art

Prior art

Prior art

Prior art FIG. 3 illustrates a wafer including a plurality of strips of closures attached thereto.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 4:
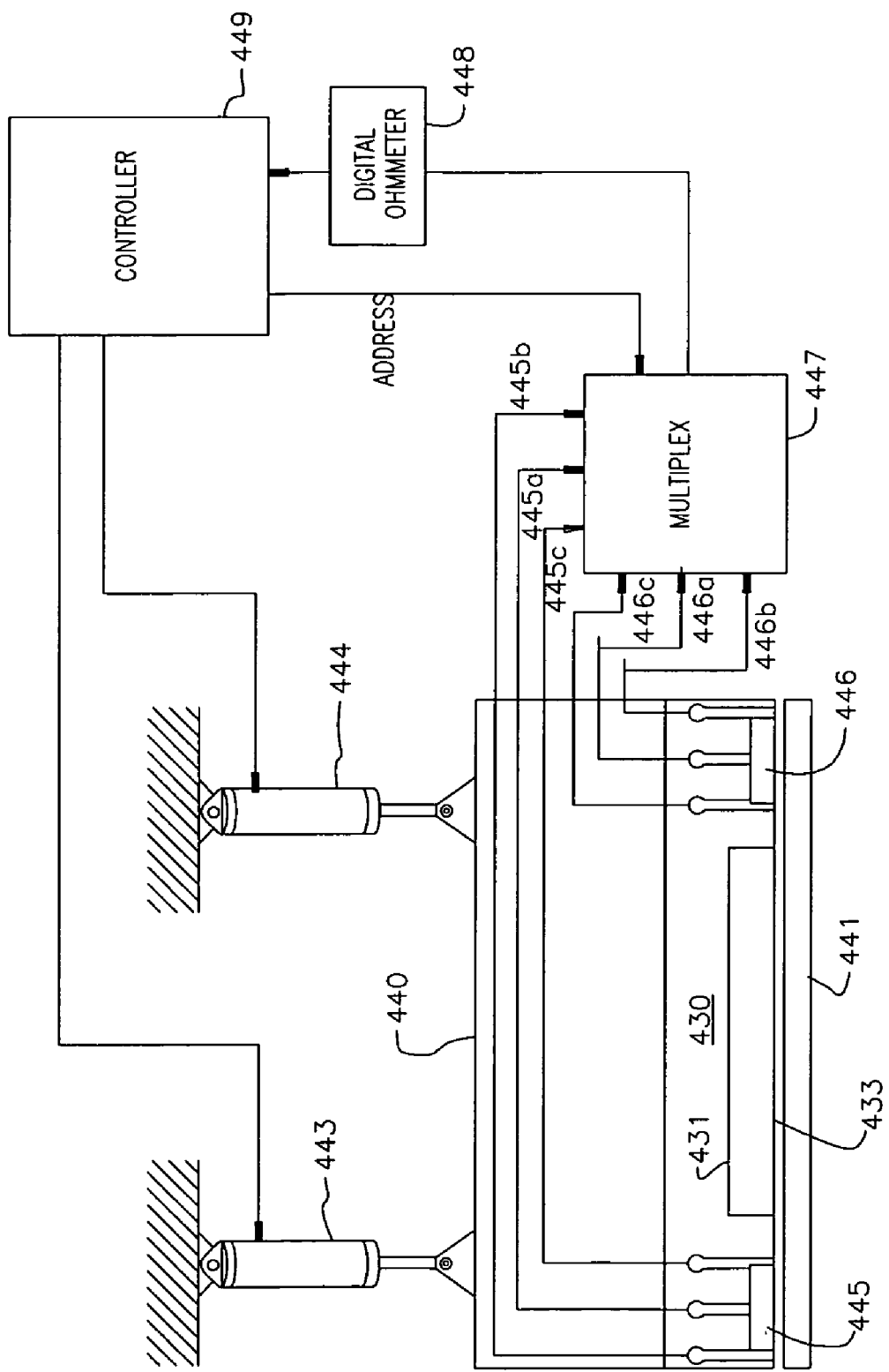
FIG. 4 illustrates a typical lapping system for lapping a flat surface of a head of a wafer.

FIG. 4 illustrates a typical lapping system for lapping a flat surface 433 of a head of a wafer. A lapping fixture 440 holds the flat surface 433 in position over a lapping plate 441. The lapping plate 441 is a flat abrasive surface for accurately lapping the surface 433 to a final dimension.

The force applied to the lapping fixture 440 is derived from first and second pressure actuators 443 and 444. Varying the force applied by the actuators 443 and 444 against the flat surface 433 controls leveling of the lapped surface 433.

The lapping device insures that the throat heights and stripe heights for all of the heads are at the correct length.

After completion of lapping the surface 433, the wafer is diced or partitioned into separate heads. The mass production of the heads as described hereinbefore substantially reduces the cost of providing lapped heads, as compared to the individual lapping required by the prior art.

The above description of a lapping system of the present invention, and the accompanying illustration of FIG. 4 are for representation purposes only. It should be apparent that lapping systems may vary per the desires of the user.

Figure 5:
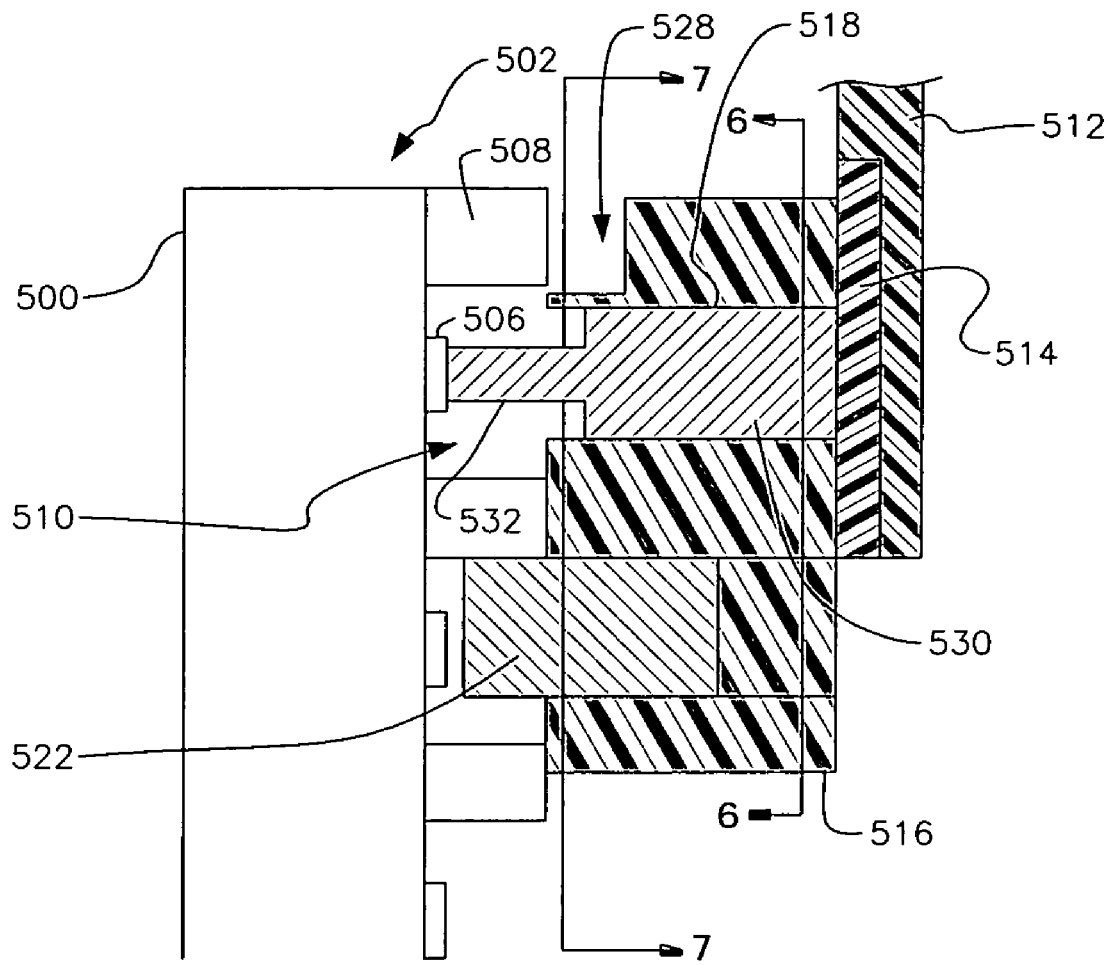
FIG. 5 illustrates a cross-sectional view of a system for measuring a head during a lapping process, in accordance with one embodiment.

FIG. 5 illustrates a system for measuring a head during a lapping process, in accordance with one embodiment. A wafer 500 is shown in a cross-sectional view taken along line 5-5 shown in FIG. 3. The wafer 500 includes at least one head 502. Each head 502 has an electrical lapping guide (ELG) (not shown) and a plurality of wafer contacts 506 in electrical communication with the ELG. Each head 502 further includes a closure 508 formed thereon defining a slot 510 in which the wafer contacts 506 are positioned.

Also included is a lapping cable 512 coupled to a testing device such as the controller 449 of FIG. 4. For reasons that will soon become apparent, such testing device is capable of measuring various dimensions of the heads during a lapping process by testing the ELGs. The lapping cable 512 further includes a plurality of lapping cable contacts 514.

An adapter 516 includes a plurality of adapter contacts 518 in electrical communication with the lapping cable contacts 514. The adapter contacts 518 are removably positionable in electrical communication with the wafer contacts 506 for measuring the head 502 during a lapping process such as that shown in FIG. 4.

In one embodiment, the adapter 516 may be constructed from a polyimide such as VESPEL TM material manufactured by DUPONT TM. Of course, any other type of insulating rigid material may be used per the desires of the user.

Figure 1:
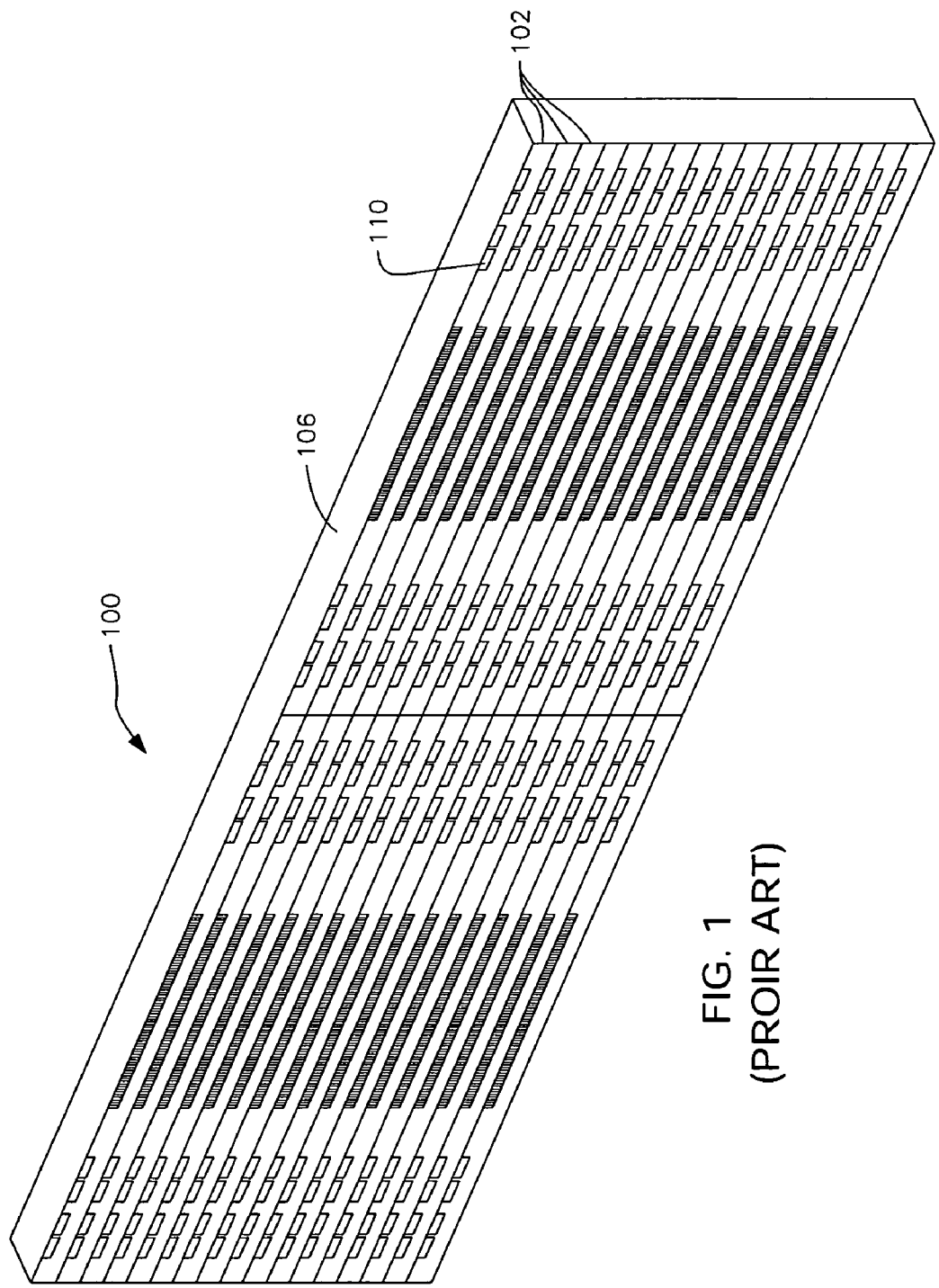
FIG. 1 illustrates a wafer on which a plurality of heads may be manufactured.
Figure 2A:
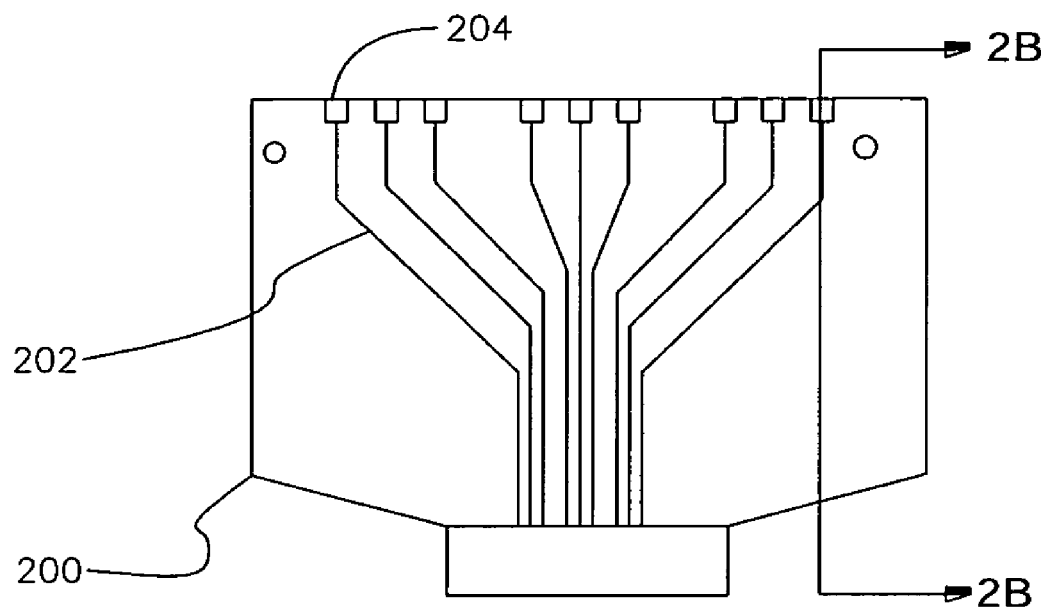
FIG. 2A is top plan view of a lapping cable which is traditionally employed to connect a testing device to the contacts formed on each of the heads.
Figure 2B:
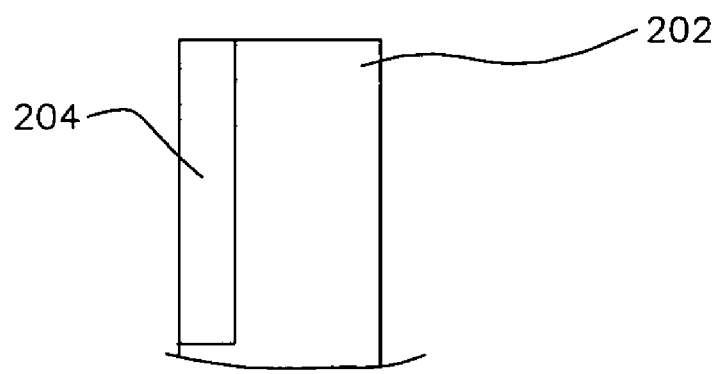
FIG. 2B is a cross-sectional view of the lapping cable taken along line 2B-2B of FIG. 2A showing the planarity of the lapping cable contact pads.
Figure 6:
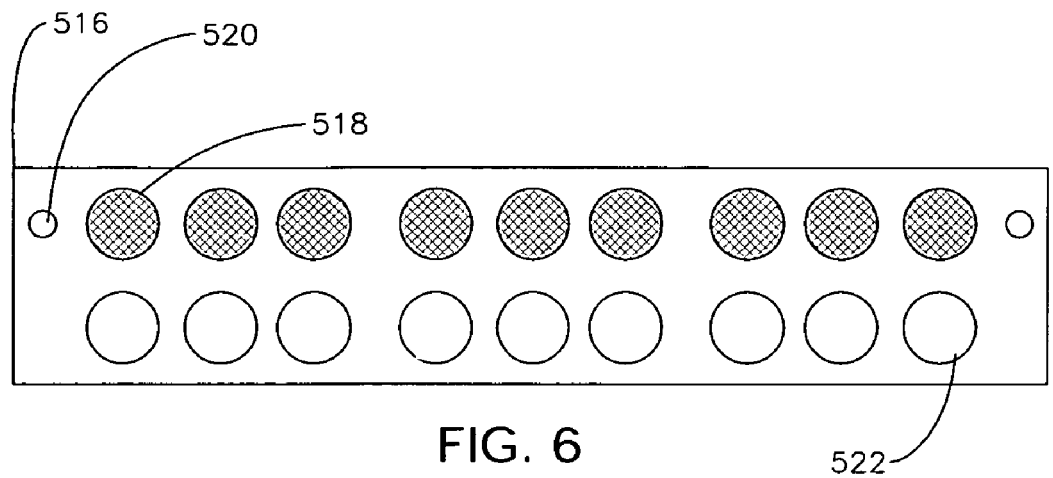
FIG. 6 is a cross-sectional view of the adapter taken along line 6-6 shown in FIG. 5.

Still yet, the adapter 516 may include a pair of holes 520 formed therein for coupling with a pair of holes (See FIG. 2A) formed in the lapping cable 512 via a pair of alignment pins (not shown). See FIG. 6. While not shown, a basket may also be included for fixedly receiving a wafer. Such basket may include holes for aligning and coupling with those of the adapter 516 and the lapping cable 512. By this structure, the lapping cable contacts 514 of the lapping cable 512 are maintained in alignment with the wafer contacts 506 during lapping.

Figure 7:
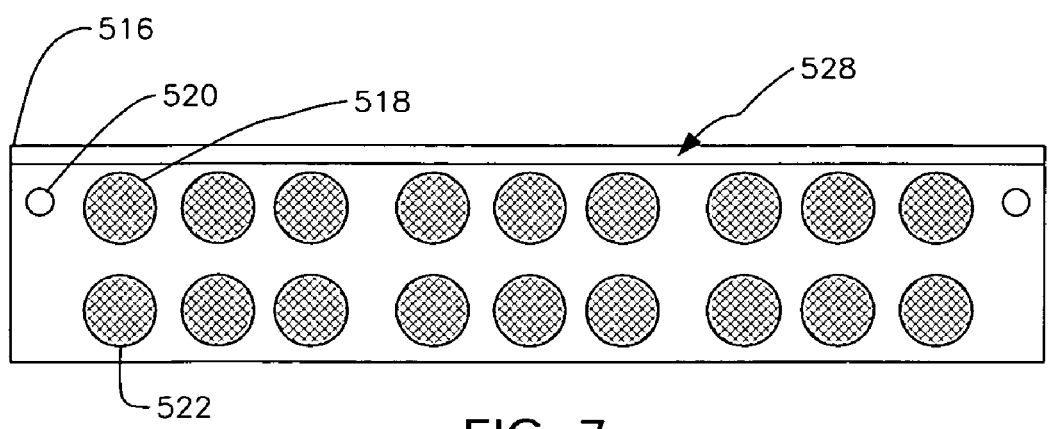
FIG. 7 is a side view of the adapter taken along line 7-7 shown in FIG. 5.

To further promote alignment, the adapter 516 may include at least one guide 522 for being removably positioned in the slot 510 defined by the closures 508 of adjacent heads 502 formed on the wafer 500. Note FIGS. 5 and 7. Such guides may be equipped with a cylindrical configuration having a cross-sectional diameter equal to or slightly less than a width of the slot 510 defined by closures 508. As an option, each guide 522 may include a pin. See FIG. 5.

Figure 8:
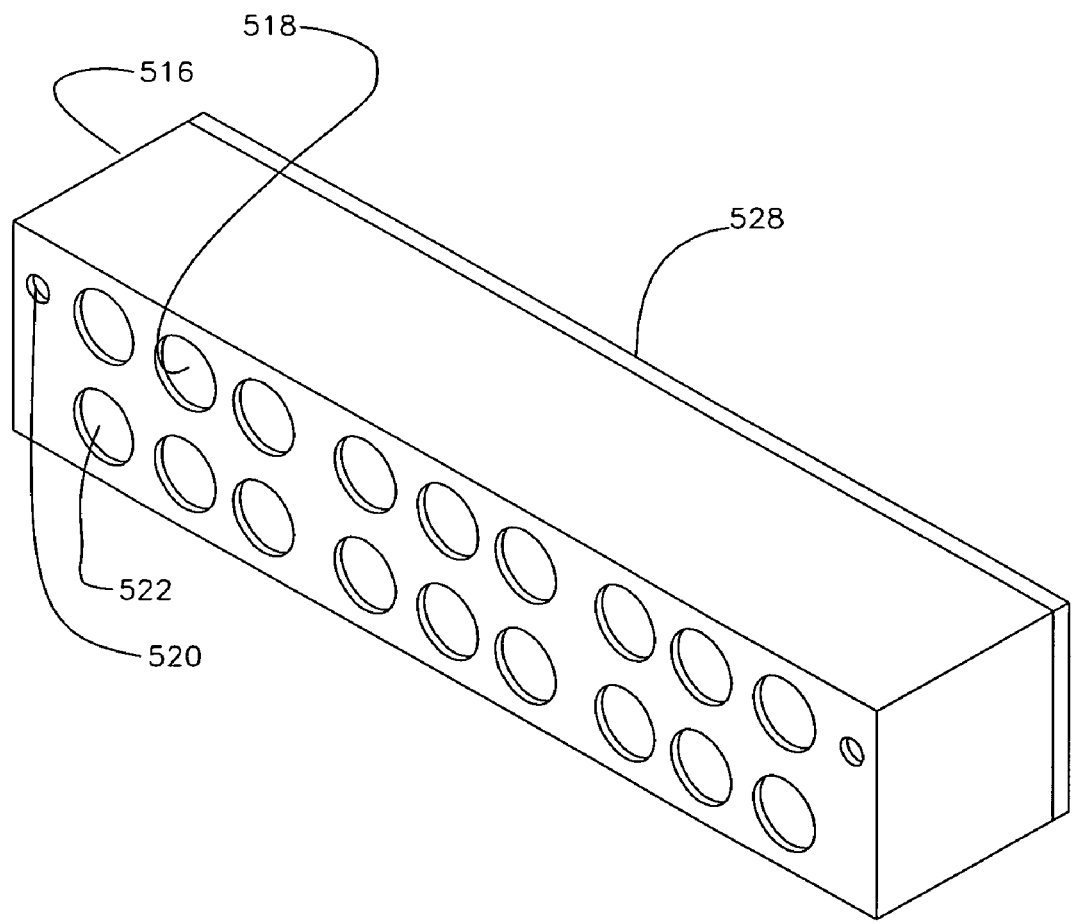
FIG. 8 is a perspective view of the adapter of FIG. 5.

As yet another option, the adapter 516 may include a recess 528 for preventing contact with the closures 508 of the wafer 500 during the lapping process. See FIGS. 5 and 8.

In another embodiment, the adapter contacts 518 may be slidably coupled to the adapter 516. Further, the adapter contacts 518 may each include a first portion 530 in electrical communication with one of the lapping cable contacts 514 and a second portion 532 in electrical communication with one of the wafer contacts 506.

As an option, the first portion 530 of each adapter contact 518 may be larger than the second portion 532 of each adapter contact 518. Further, the first portion 530 and second portion 532 may each have a generally cylindrical configuration, where the first portion 530 of each adapter contact 518 has a diameter larger than that of the second portion 532 of each adapter contact 518. This design ensures stability at a point where each adapter contact 518 is coupled to the adapter 500, and further prevents shorts at a point where electrical communication is established with the wafer contacts 506. As yet another option, the adapter contact 518 may be manufactured utilizing an in-situ process.

Figure 9:
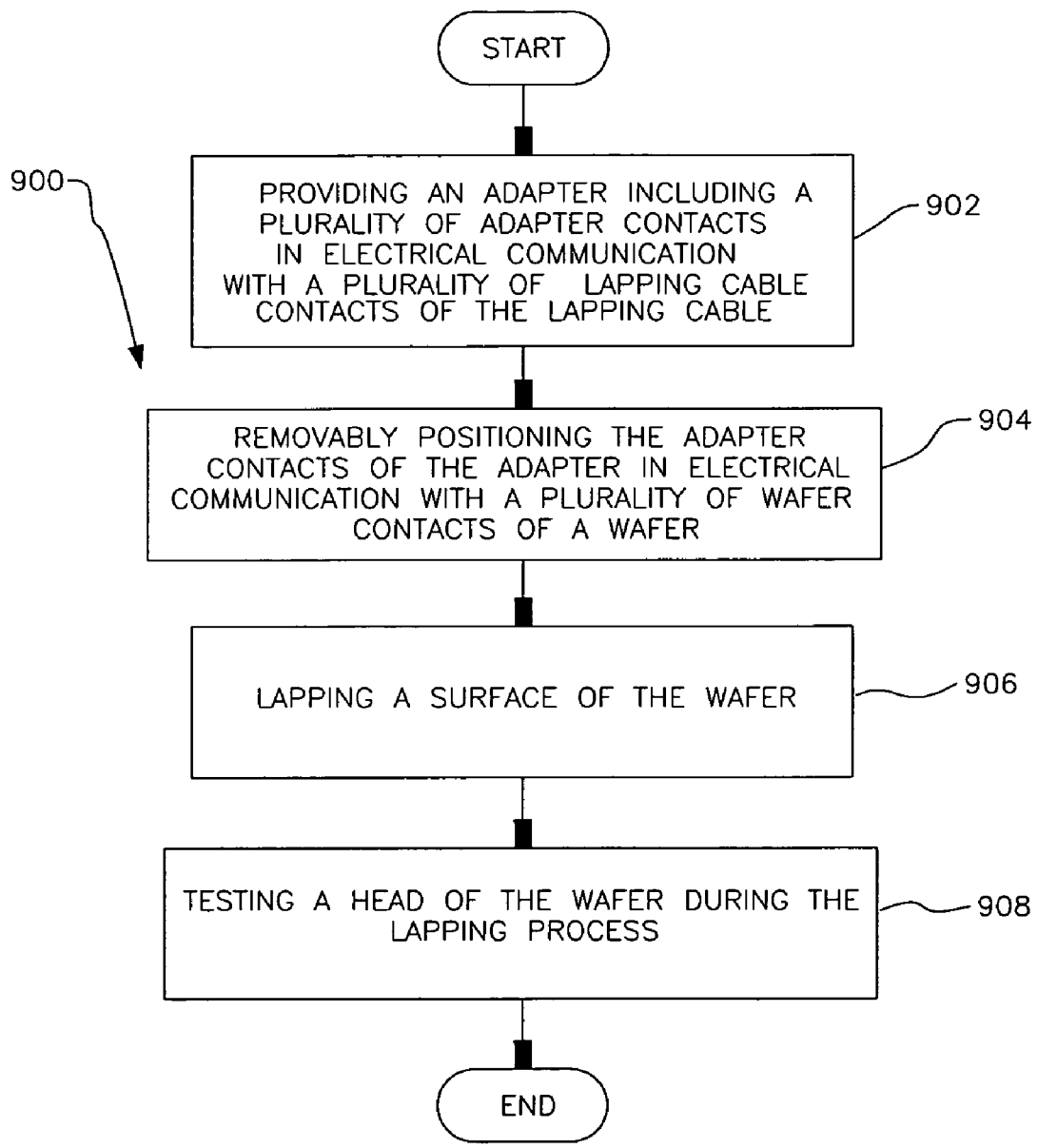
FIG. 9 is a flowchart showing a method for measuring a head during a lapping process.

FIG. 9 is a flowchart showing a method 900 for measuring a head during a lapping process. Initially, an adapter is provided in operation 902. As mentioned hereinabove, the adapter includes a plurality of adapter contacts in electrical communication with a plurality of lapping cable contacts of the lapping cable. In operation 904, the adapter contacts of the adapter are removably positioned in electrical communication with a plurality of wafer contacts of a wafer. A surface of the wafer is subsequently lapped in operation 906. During such lapping, at least one ELG of a head in the wafer is measured in operation 908.

Figure 10:
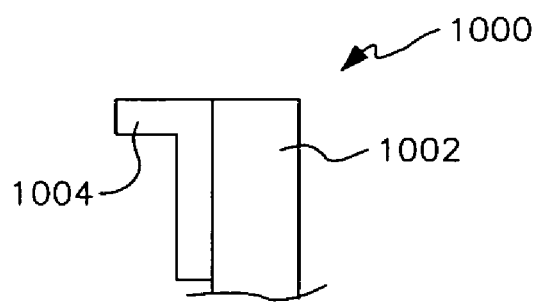
FIG. 10 is a cross-sectional view of an alternate embodiment of the present invention.

FIG. 10 is a cross-sectional view of an alternate embodiment 1000 of the present invention. The present embodiment is adapted for measuring a head during a lapping process with an adapter that is an integral component of a lapping cable 1002. In such embodiment, the lapping cable 1002 is coupled to a testing device, similar to the previous embodiment. The lapping cable 1002 may include a plurality of lapping cable contacts 1004 extending outwardly therefrom in a direction perpendicular with respect to a plane associated with the lapping cable 1002. Such lapping cable contacts 1004 are removably positionable in electrical communication with a plurality of wafer contacts of a wafer for measuring a head of the wafer during a lapping process.

While not shown, the lapping cable contacts 1004 may take any shape or form that enables the lapping cable contacts 1004 to extend within the slots defined by the closures of the wafer for establishing electrical communication with the wafer contacts of the wafer. Further, the lapping cable contacts 1004 may be constructed using a resilient material in order to afford a spring-action.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a wafer including at least one head each having an electrical lapping guide (ELG), a plurality of wafer contacts in electrical communication with the ELG, and a closure coupled to the wafer, the closure defining a slot in which the wafer contacts are positioned;
a lapping cable coupled to a testing device, the lapping cable including a plurality of lapping cable contacts; and
an adapter including a plurality of adapter contacts in electrical communication with the lapping cable contacts;
wherein the adapter contacts are removably positionable in electrical communication with the wafer contacts during a lapping process.

2. The system as recited in claim 1, wherein the adapter is constructed from a polyimide material.

3. The system as recited in claim I, wherein the adapter includes a pair of holes formed therein for coupling with a pair of holes formed in the lapping cable via a pair of alignment pins.

4. The system as recited in claim 1, wherein the adapter includes at least one guide for being removably positioned in a slot defined by closures of adjacent heads formed on the wafer.

5. The system as recited in claim 1, wherein the adapter contacts are slidably coupled to the adapter.

6. The system as recited in claim 1, wherein the adapter contacts each include a first portion in electrical communication with one of the lapping cable contacts and a second portion in electrical communication with one of the wafer contacts.

7. The system as recited in claim 6, wherein the first portion of each adapter contact is larger than the second portion of each adapter contact.

8. The system as recited in claim 7, wherein the first portion of each adapter contact has a diameter larger than that of the second portion of each adapter contact.

9. The system as recited in claim 6, wherein the adapter includes a recess for preventing contact with the wafer during the lapping process.

10. An apparatus for use with a wafer including at least one head each having an electrical lapping guide (ELG), a plurality of wafer contacts in electrical communication with the ELG, and a closure formed thereon defining a slot in which the wafer contacts are positioned, and a lapping cable coupled to a testing device, the lapping cable including a plurality of lapping cable contacts; the apparatus comprising: an adapter including a plurality of adapter contacts in electrical communication with the lapping cable contacts, wherein the adapter contacts are removably positionable in electrical communication with the wafer contacts during a lapping process.

* * * * *